W. W. WILLSON.
SPROCKET WHEEL.
APPLICATION FILED OCT. 11, 1916.
1,227,353.
Patented May 22, 1917.
2 SHEETS—SHEET 1.
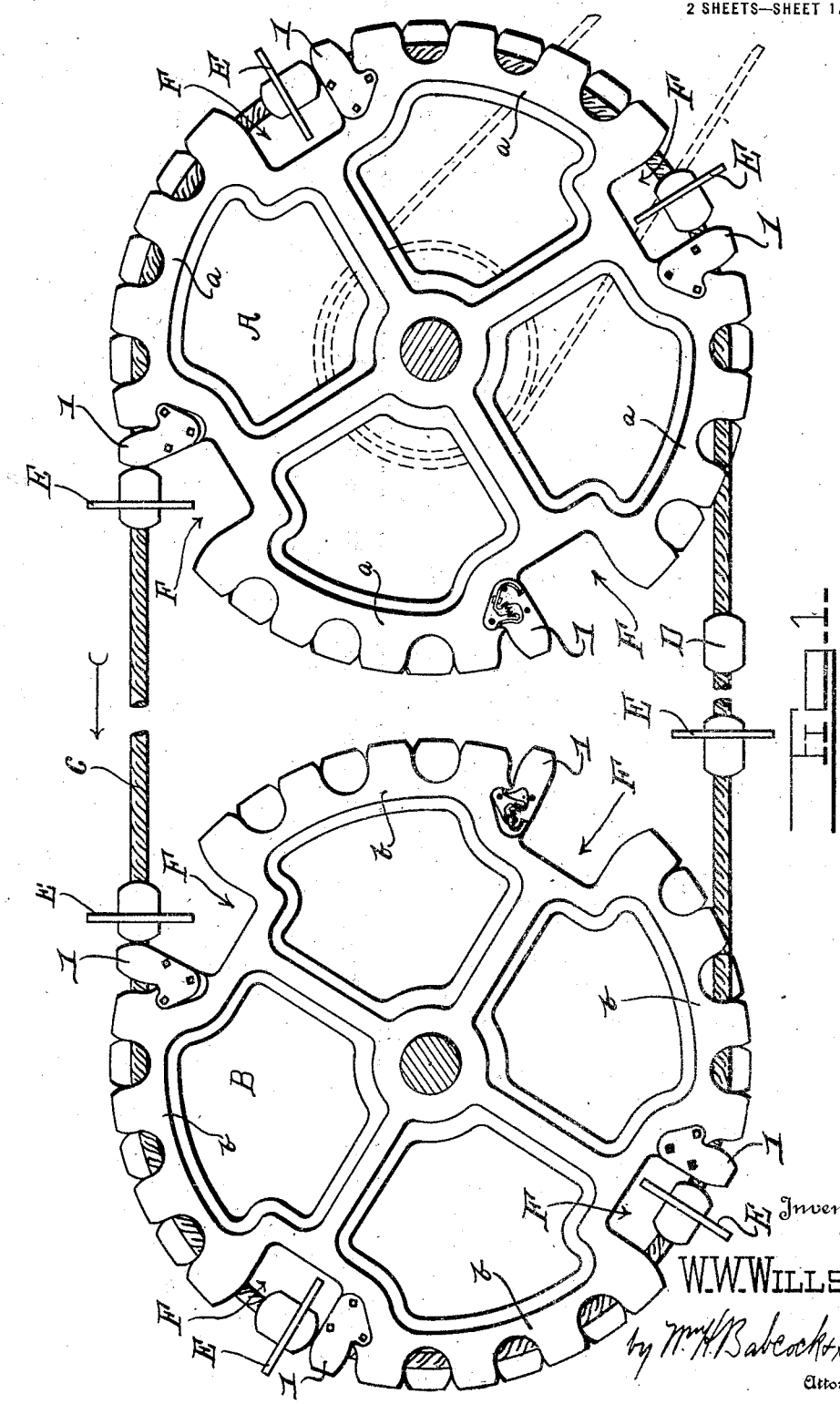
Inventor
W. W. WILLSON.
by Wm H Babcock & Son
Attorneys

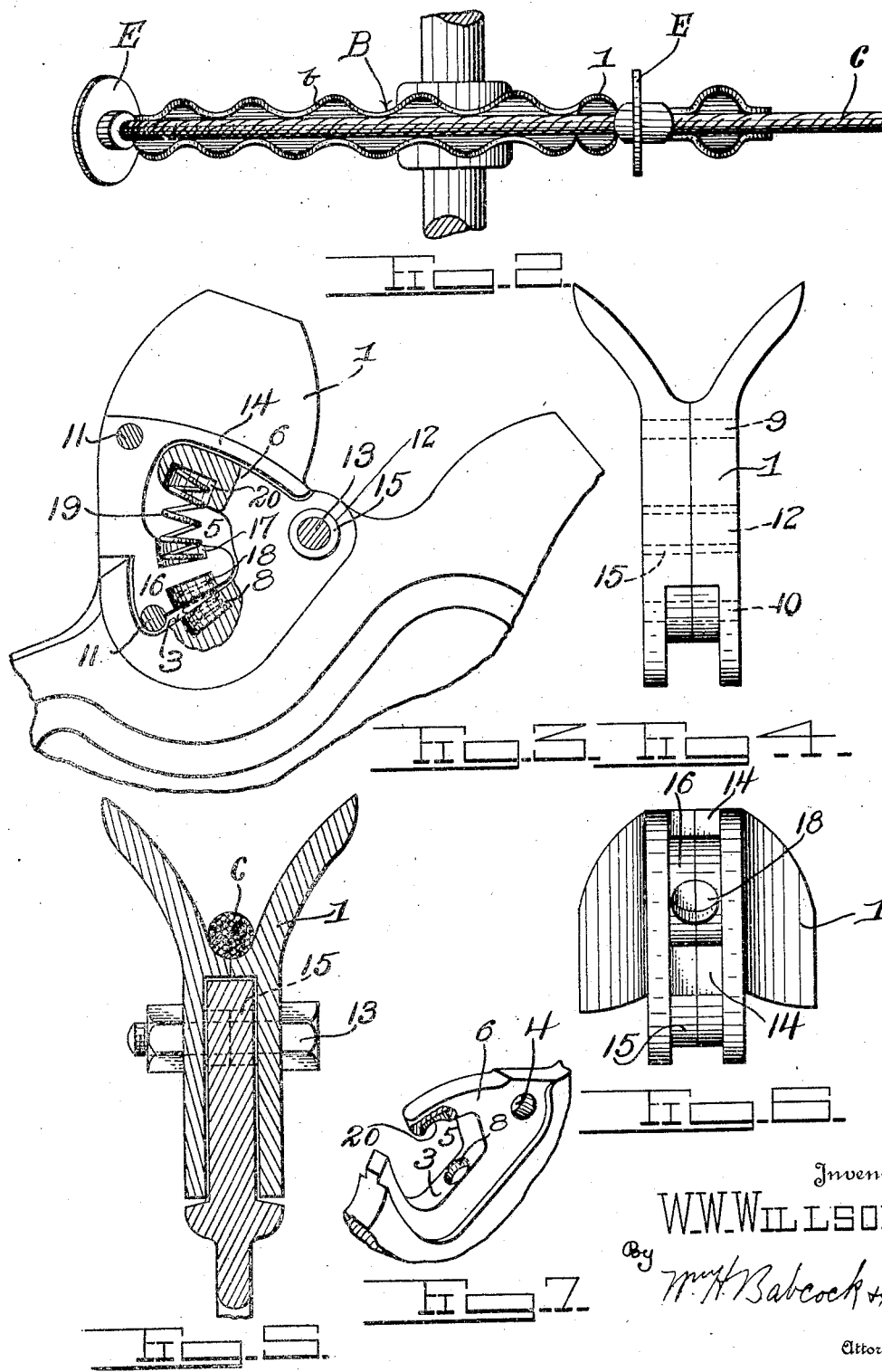

UNITED STATES PATENT OFFICE.

WILLIAM W. WILLSON, OF GAHANNA, OHIO.

SPROCKET-WHEEL.

1,227,353.

Specification of Letters Patent.

Patented May 22, 1917.

Application filed October 11, 1916. Serial No. 124,955.

*To all whom it may concern:*

Be it known that I, WILLIAM W. WILLSON, a citizen of the United States, residing at Gahanna, in the county of Franklin and State of Ohio, have invented certain new and useful Improvements in Sprocket-Wheels, of which the following is a specification.

This invention relates to cable sprocket-wheels of the yielding or spring-tooth type such as Patents 649,563, dated May 15th, 1900; 948,385, dated February 8th, 1910; and 994,896, dated June 13th, 1911, granted on applicant's prior inventions in this art, and Patents 960,756, dated June 7th, 1910, granted on the invention of Freeman R. Willson and 811,134, dated January 30th, 1906, granted on the invention of A. O. Dufour, and has for its objects to provide such a tooth which may be shifted from a drive to a driven wheel or vice versa expeditiously and with no need for any special drilling or boring or employment of additional parts; to provide for more accurate and certain action of the tooth in either use by pivoting the tooth instead of giving it longitudinal sliding arcuate travel in a recess; to guard against obstruction of the parts by grit, dirt, dust, caked grease and other foreign matter; to provide a tooth which may be cast in two identical sections, all bolt holes, etc., being cored out or formed in the molding or casting, and in this and other ways to increase the accuracy and dependability of operation and durability while decreasing the cost of manufacture and repair, all of which objects, among others, are accomplished by the construction, combination and arrangement of parts as hereinafter more fully set forth, described and claimed.

In the accompanying drawings:

Figure 1 is a side elevation of a mechanism embodying my invention, the outer section of the lower tooth of the drive wheel and the outer section of the upper tooth of the driven wheel being removed and the bolts sectioned to show the position of the spring in each of its two operations;

Fig. 2, a plan view;

Fig. 3, a detail of one of the two identical sections of one of the teeth in position on the drive wheel, indicating in dotted lines the position of the spring for the driven wheel;

Fig. 4, an end elevation of one of the teeth;

Fig. 5, a section on line 5—5 of Fig. 1;

Fig. 6, a bottom plan view of one of the teeth; and

Fig. 7, a detail perspective view of the operative end of one of the segments *a* or *b* of the drive or driven wheels A or B respectively.

Referring now in detail to the drawings, A indicates the drive wheel, B the driven wheel, C the drive cable, D the sprocket blocks and E the flights, blades, scrapers or the like, which are secured on the cable in any desired arrangement at predetermined intervals, blocks similar to D being used for that purpose. F indicates the gaps in the wheels to receive the flights, scrapers, blades or the like E and blocks D, which are let out of the gaps of the drive wheel and into the gaps of the driven wheel by the yielding teeth 1. All of the construction above mentioned, except the special construction of the tooth 1 and the adjacent parts of the wheels A and B, and all the operation as generally stated above, are old and illustrated in Patent 649,563 above mentioned, the present invention dealing only with the special construction of the teeth 1 and the slight modification in the wheels A and B necessitated thereby.

The operative end of each segment *a* and *b* of the wheels A and B respectively is formed in casting to leave a pentagonal gap or space 5 with one side open, this space 5 being partially overhung or covered on one side by an arm 6 integral with and forming part of the periphery of the wheel, and is further provided with a perforation 4 adjacent the base of said arm 6.

The yielding tooth 1 is composed of two identical sections produced preferably by casting and provided by coring, during the molding or casting, with two holes 9 and 10 to receive bolts 11 and a hole 12 to receive bolt 13, which will serve as a fulcrum for the tooth, passing through the tubular spacings lugs 15, which are integral with the respective sections of the tooth and extend halfway through the hole 4 from either side, their inner faces abutting as assembled.

Each section of each tooth is provided with a spacing flange 14, which receives the cable on its exterior, a spacing tubular lug 15 above mentioned, and a lug 16, the inner faces of said flange, spacing lug 15 and lug 16 all lying in the same plane, and the lug 16 being so arranged, when the tooth is assembled on the wheel, that it will move between the opposing diverging faces of the arm 6 and inner wall 3 in the pentagonal space or gap 5 above mentioned, extending into said space 5 through the open side above referred to.

The arm 6 is provided in its inner face with a recess 20, the opposing wall 3 with a recess 8 and the lug 16 in its upper face with a recess 17 and in its lower face with a recess 18; all of said recesses being of the same size in cross-section, being arcuate in form and having their centers on a common arc struck from the center of hole 4 in a plane perpendicular to the axis of the wheel, the recesses 17 and 20 receiving the respective ends of a helical spring 19 when the tooth is applied to a drive wheel, so that the spring 19 will force the tooth inward; and the recesses 8 and 18 receiving the respective ends of the helical spring 19 when the tooth is applied to a driven wheel, so that the spring 19 will force the tooth outward.

All the parts of the wheels A and B and the tooth 1, excepting the spring 19 and bolts, will preferably be cast on account of the cheapness of this method of production, any objectionable roughness that may occur in the casting being ground off, all the parts of the teeth 1 and the wheels A and B being devised especially with this method of production in view, the desire being to obtain the advantage of this cheap method of production without sacrificing any degree of reliability or certainty of action.

It will be observed that there are no pockets or other parts or surfaces on the wheels or teeth requiring any boring, drilling or machining; that there are no pockets having surfaces which require to be perfectly smooth and are difficult of access, requiring special and costly operations to attain the desired smooth surface; also that there are no interior pockets to collect grit, dirt, and other foreign matter which would block the movements of the teeth.

Further, it will be noted that the pressure of the springs 19, in both directions, is applied to the teeth on the arc of a circle struck from the fulcrum of the respective teeth, insuring certainty of action and preventing binding of the springs on the edges of their respective recesses.

To assemble, one of the sections of a tooth 1 is fitted on one side of the wheel with its lug 15 projecting half-way through one of the holes 4 thereof, then the spring 19 will be inserted, in the case of the drive wheel, with one end in recess 17, the other end in recess 20, in the case of the driven wheel, with one end in recess 18, the other in recess 8. The other section of the tooth is then fitted on with its lug 15 projecting half-way through the same hole 4 and abutting against the inner end of lug 15 of the first mentioned section and the bolts 11 and 13 are passed through their respective holes and their nuts turned home. This is repeated for each spring tooth 1 on the wheel. To change a driven to a drive wheel it is simply necessary to remove one section of each of its teeth 1, remove the spring 19 of each tooth and reinsert it with its respective ends in the recesses 17 and 20 and then replace the removed section, and vice versa.

The spacing flange 14, spacing lug 15 and lug 16 will preferably be cast integral with their respective tooth sections and the arms 6 of each wheel will preferably be cast integral therewith, all as shown. While this is not essential to the operation of the device, it is highly desirable as a measure of economy in production.

From the above it will be evident that the tooth 1 may be equally well applied to an idler sprocket wheel or for any reverse motion by placing a tooth on the end of each segment, so as to have one on each side of each gap F of the wheel and arranging the spring 19 of each tooth in the correct one of its two positions as may be necessary according to the function and use of the idler.

Having thus described my invention, what I claim as new and desire to secure by Letters Patent is:

1. A sprocket wheel having its periphery divided into segments by gaps to receive devices on an element engaging said wheel, the operative end of each segment being recessed to leave an undercut arm at the periphery, in combination with a tooth having a lug working in said recess, a spring operating on one of the faces of said lug and the opposing face of said recess to actuate said tooth in a plane at right angles to the axis of said wheel, and means for pivotally securing said tooth on the wheel.

2. A sprocket wheel having its periphery divided into segments, one end of each segment being recessed to leave an undercut arm at the periphery and provided with a hole, in combination with a section tooth provided with a lug, means passing through said tooth and through said hole for pivotally securing said tooth to the wheel, and a spring bearing on one of the faces of said lug and the opposing face of said recess to actuate said tooth.

3. A sprocket wheel having its periphery divided into segments, one end of each segment being recessed to leave an undercut arm at the periphery and provided with a hole, in combination with a tooth having a lug working in said recess, means passing through said tooth and said hole to pivotally secure said tooth to said wheel, both faces of said lug and of said recess being recessed, and a spring having its ends in two of the latter recesses to actuate said tooth.

4. A sprocket wheel having its periphery divided into segments, one end of each segment being recessed to leave an undercut arm, and provided with a hole, in combination with a tooth composed of two identical sections and having a lug working in said recess, means passing through said tooth and through said hole for pivotally securing said tooth to the wheel, and a spring bearing on one of the faces of said lug and the opposing face of said recess to actuate said tooth.

5. A sprocket wheel having its periphery divided into segments, one end of each segment being recessed to leave an arm, and provided with a hole, in combination with a tooth having a lug working in said recess, means passing through said tooth and hole for pivotally securing said tooth to said wheel, and an actuating spring, the faces of said lug and the walls of said recess being arcuately recessed on a common arc of a circle struck from the axis of said means, and the ends of said spring fitting in two of said arcuate recesses to actuate said tooth.

6. A sprocket wheel having its periphery divided into segments, one end of each segment being recessed to leave an arm and provided with a hole, in combination with a tooth having a lug located in said recess, means passing through said tooth and hole for pivotally securing the tooth on the wheel, and an actuating helical spring, the faces of said lug and the walls of said recess being arcuately recessed on a common arc of a circle struck from the axis of said means, and the ends of the spring fitting in two of said arcuate recesses.

In testimony whereof, I have signed my name to this specification in the presence of two subscribing witnesses.

WILLIAM W. WILLSON.

Witnesses:
  NELLIE TURKOPP,
  FRANK SCHENCK.